(No Model.) 2 Sheets—Sheet 1.

J. R. JOHNSON & C. K. WRIGHT.
CARRIAGE SPRING.

No. 324,703. Patented Aug. 18, 1885.

Witnesses:
John Grist
R. P. King

Inventors:
J. R. Johnson
C. K. Wright
By Henry Grist
Atty.

(No Model.) 2 Sheets—Sheet 2.

J. R. JOHNSON & C. K. WRIGHT.
CARRIAGE SPRING.

No. 324,703. Patented Aug. 18, 1885.

UNITED STATES PATENT OFFICE.

JOSEPH RICHARD JOHNSON AND CHARLES KOSSUTH WRIGHT, OF GANANOQUE, ONTARIO, CANADA.

CARRIAGE-SPRING.

SPECIFICATION forming part of Letters Patent No. 324,703, dated August 18, 1885.

Application filed September 1, 1884. (No model.)

*To all whom it may concern:*

Be it known that we, JOSEPH RICHARD JOHNSON and CHARLES KOSSUTH WRIGHT, both of Gananoque, in the county of Leeds, in the Province of Ontario, in the Dominion of Canada, have jointly invented certain new and useful Improvements in Carriage-Springs; and we do hereby declare that the following is a full, clear, and exact description of the same, reference being had to the accompanying drawings, in which—

Figure 1:
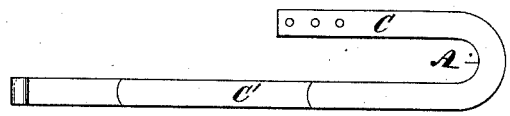
Figure 2:
Figure 3:
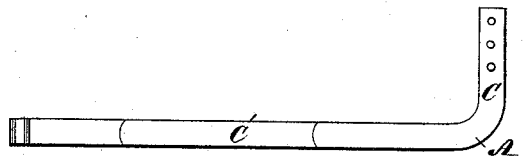
Figure 4:
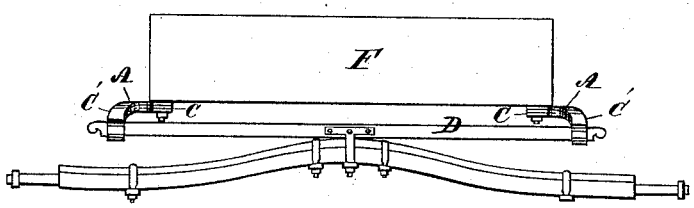
Figure 5:
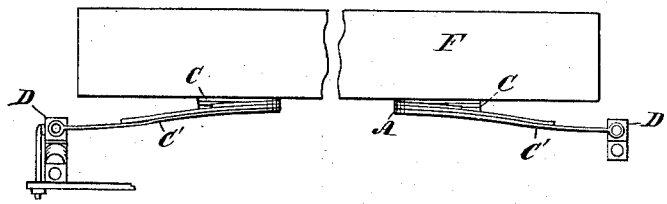
Figure 6:
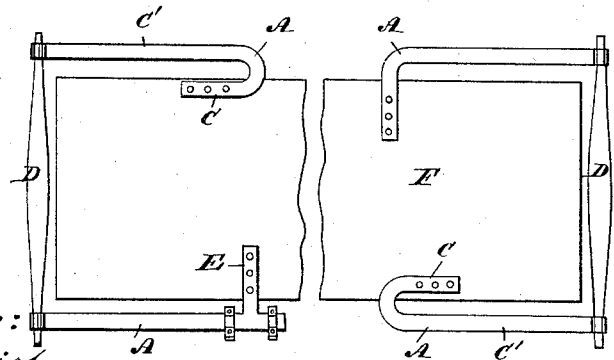
Figure 7:
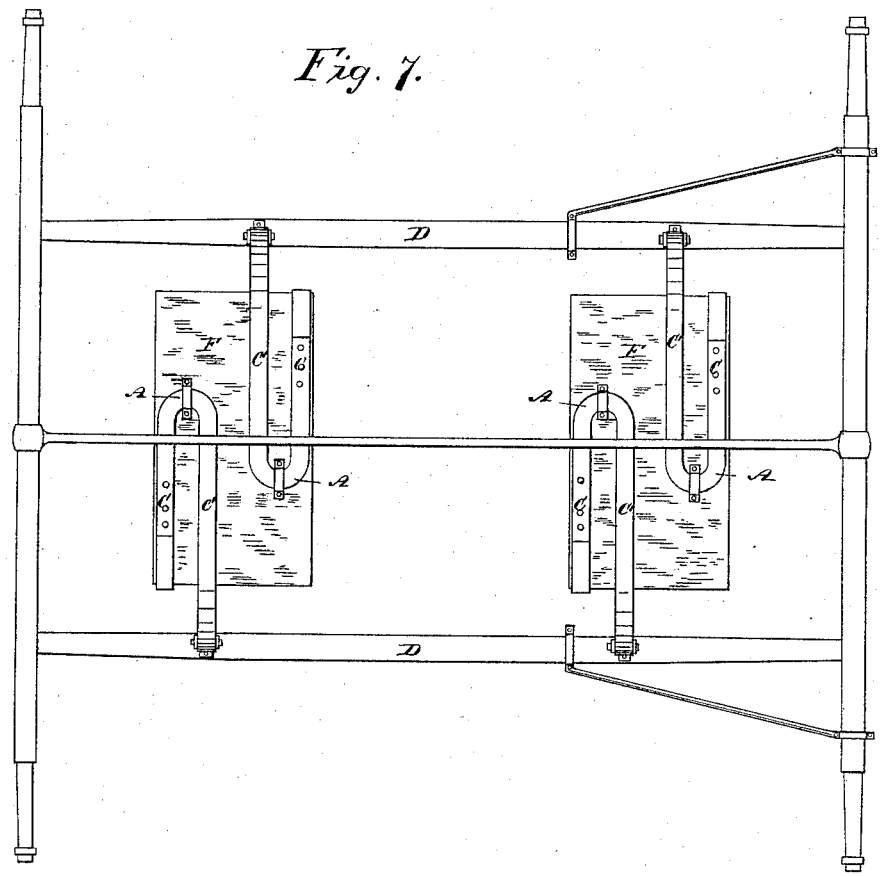

Figure 1 is a plan view of our improved carriage-spring. Fig. 2 is a side view of the same. Fig. 3 is a modification of Fig. 1. Fig. 4 is an end view showing the application of our improved springs to a carriage. Fig. 5 is a side view of the same. Fig. 6 is an inverted plan showing the application of our springs as side springs to vehicles, and Fig. 7 is an inverted plan showing the application of our springs as cross-springs to side-bar vehicles.

Our invention has for its object to construct a light easy-riding spring of the least possible height, and applicable either as side springs or as cross-springs.

Our invention consists of a spring of one or more leaves turned edgewise, whereby the return of the leaves may be bolted near the extremity to the under side of the floor or body of the vehicle and the free end shackled or hung to the axles or to side bars or other bearing outside of or exterior to the body of the vehicle.

A represents our improved spring, constructed of one, two, or more leaves turned edgewise, U or L shaped near the middle, the return being shortest, with holes to bolt the spring to the under side of a carriage body or platform, F, longitudinally or transversely of the vehicle, and clipped together at the turn. The leaves lap one upon another, the longest leaf being at the bottom and the upper ones diminishing in length. The lower leaf is formed with an eye to receive a shackle. The rigid leg C from the turn to the extremity is straight, and the spring-leg C' inclines downwardly from the turn, and preferably has a short bend upwardly to the eye, the inclination varying less or more, according to the weight the spring is suited to bear. The rigid leg C of the spring is bolted to the floor of the carriage, and the spring leg C' extends therefrom and is shackled to a bolster, D, or to a semi-elliptical spring, one on each axle, as shown in Figs. 4, 5, and 6, or to side-bars, as shown in Fig. 7. As a substitute for the turn, the ends of the leaves may be secured to an arm, E, bolted to the under side of the body F and extending outwardly, as shown in Fig. 6.

By our improved spring the body of the carriage can be set low, as the springs need have very little height.

The object in bending the springs edgewise is to obtain greater length of the spring portion and increase its elasticity, which extends from the eye to the first bolt-hole. The tension of the spring at the bend will be torsional, and the shackle will admit of tensional elongation of the spring.

We are aware that a bifurcated spring having a straight shank and two curved arms bent outward and back so as to lie parallel to the shank and all composed of a single leaf, and also that a spring has been shown composed of a single leaf bent so as to form a constant curve and operating by torsion; but we do not claim either of these devices; but What we do claim, and desire to secure by Letters Patent, is—

The combination, with a carriage platform and running-gear, of torsion-springs composed of several connected leaves bent so as to form a long and a short leg, the short leg being connected to the platform near one side thereof and the long leg to the running gear or frame, and the two legs being substantially parallel to one another, substantially as described and shown.

J. R. JOHNSON.
CHARLES KOSSUTH WRIGHT.

Witnesses:
THOMAS S. MOFFATT,
BYRON BRITTON.